United States Patent [19]

Mac Intyre et al.

[11] 4,123,630
[45] Oct. 31, 1978

[54] SAFETY DEVICE

[76] Inventors: Robert W. Mac Intyre, 103 Grove St., Concord; Edward J. Wysocki, 5 Radford Pl., Hyde Park; Philip Orifice, 28 Galen St., Waltham; Ralph DiTillio, 15 Hazel Park, Everett, all of Mass.

[21] Appl. No.: 742,596

[22] Filed: Nov. 17, 1976

[51] Int. Cl.$^2$ .................. H01H 35/00; F16D 9/00
[52] U.S. Cl. ........................... 200/52 R; 192/131 R
[58] Field of Search ............ 192/131 R, 131 A, 132, 192/134; 200/5 B, 50 C, 61.42, 52 R; 361/189, 194

[56] References Cited

U.S. PATENT DOCUMENTS

| 1,046,373 | 12/1912 | Benjamin | 192/131 R |
|---|---|---|---|
| 2,301,491 | 11/1942 | Yanchenko | 192/131 H |
| 2,541,577 | 2/1951 | Dornbos et al. | 361/189 |
| 2,545,549 | 3/1951 | Guill et al. | 192/131 R |
| 2,594,520 | 4/1952 | Tiedman | 361/189 X |
| 2,669,686 | 2/1954 | Riche | 192/131 R X |
| 3,103,270 | 10/1963 | Tilbury | 361/189 X |
| 3,522,868 | 8/1970 | Genger | 192/131 R |

Primary Examiner—James R. Scott
Attorney, Agent, or Firm—Joseph Zallen

[57] ABSTRACT

A safety device to be used with a machine so as to have the operator keep both hands occupied during operation of the machine. The device includes a solenoid member having a core extension which blocks a first control element of the machine when the solenoid member is energized. The operator pushes a hand-operable switch and a hand-operable actuation member which in turn actuates a second control element.

2 Claims, 5 Drawing Figures

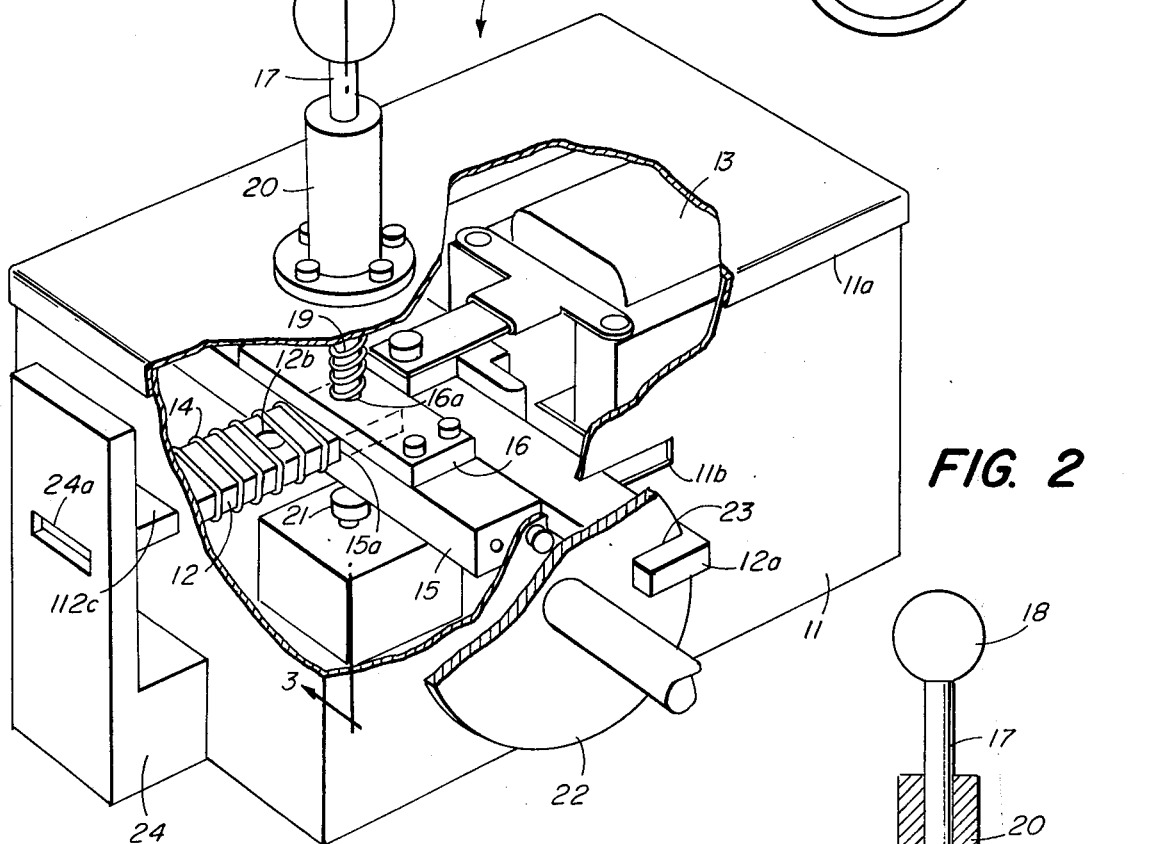

SAFETY DEVICE

BACKGROUND OF INVENTION

This invention relates to a safety device for use with machines wherein there is danger of injury to the operator if the operator accidentally places his hands in an improper position during the operation of the machine. This invention is particularly applicable to such machine tools as punch presses, where accidental dropping of the ram can cause serious injury. However this invention is not limited in its application to punch presses, but is generally applicable to any machine where the hands of the operator should be in a safe position during operation of the machine.

Safety devices have been described in the past which require both hands for starting a machine and thus keep the hands out of the reach of the machine, as for example U.S. Pat. Nos. 786,473; 1,046,373; 1,170,615; 1,556,054; 2,541,577; 2,545,549; 2,559,495; 2,594,520; 2,669,686; 3,103,270 and 3,791,496. These prior art devices have one or more disadvantages, as for example, complexity, high cost, lack of reliability and difficulty in installation.

One object of the present invention is to provide a simple, reliable safety device which can be readily attached to a machine with a minimum of expense.

Further objects and advantages of the present invention will be apparent from the description and claims which follow taken together with the appended drawings.

SUMMARY OF INVENTION

The invention comprises generally a solenoid member which has an extension attached to its core. The core extension is adapted to be in such a position so as to block one necessary control element of a machine when the solenoid is unenergized. When the solenoid is energized, the action of the core extension member is to unblock the control element. A hand-operable switch is provided for the solenoid. Spaced apart from the switch is a hand-operable actuation member. This actuation member is adapted to actuate a second control element of the machine, but can only do so when the core extension is pulled out of the way when the solenoid is energized. The machine with which the safety device of this invention is used requires that both control elements be actuated before the machine can operate.

Control elements include mechanical, electrical, hydraulic and pneumatic switches and valves. For example, in a punch press, one control element can be a rotating disc brake where actuation of the solenoid switch releases the extension member from blocking the rotation of the disc brake, and depression of the hand-operable actuation member contacts a switch which starts the motor. In another version the motor on the machine can be kept running and the rotating disc brake mounted on the motor shaft with a slip clutch. In such an instance the hand-operable actuation member can be a lever which permits operation of a foot pedal when the solenoid is energized which at the same time disengages from the disc brake.

In one embodiment of this invention, the solenoid core extension has a lateral portion which engages a slot in a rotary control element so as to keep it from rotating when the solenoid is energized. The core extension also has an orifice which registers with a hand-operable, vertical plunger to actuate a control element in the form of a switch only when the solenoid is energized.

In a modification of this form of the invention, the lever can be substituted for the knob of the plunger wherein the lever motion is arranged to actuated the second control element and the bottom switch is omitted.

In another form of this invention the extension itself prohibits downward travel of the hand-operable actuation member which is in the form of a lever until the solenoid is energized.

BRIEF DESCRIPTION OF DRAWINGS

FIG. 1 is a perspective view of one embodiment of this invention showing a solenoid switch and a movable rod.

FIG. 2 is an enlargement with cutaway of a portion of FIG. 1.

FIG. 3 is a partial section along lines 3—3 of FIG. 2.

FIG. 4 is a partial view showing a modification of the top of FIG. 2.

FIG. 5 is a partial view showing a modification of the side portion of FIG. 2.

SPECIFIC EXAMPLES OF INVENTION

In the embodiment illustrated in FIGS. 1-3, there is illustrated a box 25 containing a solenoid switch actuated by button 26. Solenoid 13, itself, is housed within box 10 comprising a body 11 and a cover 11a. The solenoid core extension 12, as shown in FIG. 2, is normally to the left and extends through slot 15a in transverse frame member 15 and then through a slot in the end wall of body 11 to slot 24a in support 24 by virtue of spring 14 pressing against transverse frame members 15 and 16 held on the walls of body 11. Solenoid core extension 12 has an orifice 12b and a lateral extension 12a which in unenergized condition extends through a slot 11b in body 11 so as to lock in notch 23 in machine wheel 22. Machine wheel 22 is a first control element required for operation of a machine.

Through the cover of the box 11a is mounted a housing 20 in which a plunger rod 17 is movable and is terminated by knob 18. Rod 17 extends through the housing 20 and through an orifice 16a in block 16 to sit on top of the solenoid bar 12 and is acted on by spring 19.

When both the knob 18 and switch 26 are pressed, the sequence of events is as follows. The solenoid 13 is energized so that the solenoid core extension 12 is withdrawn from support 24 and orifice 12b is aligned with orifices 16a and 15b so that the rod 17 extends through the solenoid bar so as to actuate machine switch 21, a second control element.

In the modification illustrated in FIG. 4, the knob has been removed from the plunger and a lever 119 is shown resting on a notched block 118 on top of plunger rod 117 in housing 120. The lever 119 is pivotally supported on a frame 121 and is arranged to actuate a second control element (not shown) on a machine when it is depressed. Thus, the operation of a machine utilizing this version of the invention requires simultaneous actuation of the solenoid switch and depression of the lever which is made feasible by the unblocking of the plunger 117 by the alignment of orifices when the solenoid is energized. It is obvious that the second control element switch 21 is not used and its place has been taken by the control element operated by the motion of the lever 119.

In the modification illustrated in FIG. 5, the lever 125, supported by pivotal connection 126, actuates a second control member (not illustrated), but is prevented from doing so unless the solenoid core extension member 112c has been withdrawn into the solenoid by energization of the solenoid. Otherwise the extension 112c seats in orifice 124a of support 124 and thus prevents the lever 125 from being depressed.

It is preferred that all switches, actuation members and control elements be so constructed and arranged that they would return to their inoperative position, as for example by springs or the equivalent, after the solenoid is de-energized, and that the solenoid switch itself require constant pressure to keep the solenoid energized. In this manner, simultaneous application of both hands of the operator on the hand-operable solenoid switch, and the hand-operable actuation member is required not only to initiate operation of the machine, but to keep the machine in operation.

We claim:

1. A safety device to prevent inadvertent operation of a control element in a machine comprising:
   (a) a container (10) having an interior, transverse frame means (15);
   (b) a solenoid (13) spaced within said container (10) and having a longitudinally movable core extension (12), said core extension (12) extending through a slot (15a) in said transverse frame means and having means cooperable with the control element:
   (c) return spring means (14) associated with said core extension (12);
   (d) vertically movable plunger means (17) extending through an orifice (15a, 16a) in said transverse frame means;
   (e) return spring means 19 associated with said plunger means (17); and,
   (f) switch means (25, 26) connected to said solenoid (13) and requiring constand pressure to keep said solenoid energized.

2. The safety device of claim 1 wherein said core extension (12) has a lateral extension (12a) extending through a side slot (11b) in said container (10) and cooperating with the control element.

* * * * *